United States Patent
Chang et al.

(10) Patent No.: US 10,872,735 B2
(45) Date of Patent: Dec. 22, 2020

(54) SUPERCAPACITOR OF N—P DOPING POROUS GRAPHENE MATERIAL IN IONIC LIQUID ELECTROLYTE AND METHOD FOR PREPARING THEREOF

(71) Applicant: National Chung-Shan Institute of Science and Technology, Taoyuan (TW)

(72) Inventors: Chien-Liang Chang, Taoyuan (TW); Wu-Ching Hung, Taoyuan (TW); Jeng-Kuei Chang, Hsinchu (TW); Bo-Rui Pan, Changhua County (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 171 days.

(21) Appl. No.: 16/203,560

(22) Filed: Nov. 28, 2018

(65) Prior Publication Data

US 2020/0043673 A1 Feb. 6, 2020

(30) Foreign Application Priority Data

Jul. 31, 2018 (TW) .............................. 107126804 A

(51) Int. Cl.
| | |
|---|---|
| *H01G 11/32* | (2013.01) |
| *H01G 11/24* | (2013.01) |
| *H01G 11/86* | (2013.01) |
| *H01G 11/58* | (2013.01) |
| *H01G 11/26* | (2013.01) |

(52) U.S. Cl.
CPC .............. *H01G 11/32* (2013.01); *H01G 11/24* (2013.01); *H01G 11/26* (2013.01); *H01G 11/58* (2013.01); *H01G 11/86* (2013.01)

(58) Field of Classification Search
CPC ........ H01G 11/32; H01G 11/24; H01G 11/26; H01G 11/1158–64; H01G 11/84; H01G 11/86
See application file for complete search history.

(56) References Cited

U.S. PATENT DOCUMENTS

2014/0098465 A1* 4/2014 Bendale ................ H01G 11/82
361/502
2017/0317341 A1* 11/2017 Tseng ..................... H01G 11/36

* cited by examiner

*Primary Examiner* — Scott B Geyer
(74) *Attorney, Agent, or Firm* — Winston Hsu

(57) ABSTRACT

A high volumetric energy and power density supercapacitor is provided. This supercapacitor includes a coin cell, a spring lamination, a working electrode, a counter electrode, a separator, and an ionic liquid electrolyte. The working and counter electrodes are N—P doping porous graphene coated on Al substrate. The ionic liquid electrolyte is EMI-FSI. The method of producing N—P doping porous graphene includes following steps: S1: Graphite oxide is quickly transferred into the furnace, which had been held at 300° C. and the porous graphene can be produced. S2: The porous graphene and red phosphorus are put together in the evacuated tube furnace and heated to 700° C. for 1 hr. S3: Heated to 800° C. for 30 min in a mixed argon and ammoniac atmosphere and then the N—P doping porous graphene can be made. The capacitance of the supercapacitor is 105 F/g and the volumetric power density is 1.19 kW/L.

11 Claims, 16 Drawing Sheets

| Type of ionic liquid | EMI-BF$_4$ | EMI-TFSI | EMI-FSI | PMP-FSI | BMP-FSI |
|---|---|---|---|---|---|
| Viscosity (mPa.s) | 27.9 | 24.1 | 17.9 | 40 | 60 |
| Conductivity (S/m) | 1.44 | 0.96 | 1.55 | 0.88 | 0.51 |

FIG. 2

|  | Type of cation | | | Type of anion | | |
|---|---|---|---|---|---|---|
|  | EMI$^+$ | PMP$^+$ | BMP$^+$ | BF$_4^-$ | TFSI$^-$ | FSI$^-$ |
| Diameter of ions (nm) | 0.57 | 0.63 | 0.66 | 0.46 | 0.65 | 0.53 |

FIG. 3

| Scanning rate (mV/s) | Undoped porous graphene |
|---|---|
| | Capacitance (F/g) |
| 200 | 115 |
| 500 | 79 |
| 800 | 64 |
| 1000 | 57 |
| 3000 | 28 |
| 5000 | 19 |
| 8000 | 12 |
| 10000 | 10 |
| 13000 | 8 |

FIG. 9

| Scanning rate (mV/s) | N-P doping porous graphene |
|---|---|
| | Capacitance (F/g) |
| 200 | 105 |
| 500 | 81 |
| 800 | 70 |
| 1000 | 65 |
| 3000 | 38 |
| 5000 | 26 |
| 8000 | 18 |
| 10000 | 15 |
| 13000 | 13 |

FIG. 10

SUPERCAPACITOR OF N—P DOPING POROUS GRAPHENE MATERIAL IN IONIC LIQUID ELECTROLYTE AND METHOD FOR PREPARING THEREOF

CROSS REFERENCE TO RELATED APPLICATION

This application claims the priority benefit of Taiwan Patent Application Serial No. 107126804, filed Jul. 31, 2018. The entirety of the above-mentioned patent application is hereby incorporated herein by reference and made a part of this specification.

BACKGROUND OF THE INVENTION

1. Field of the Invention

The present invention relates to a supercapacitor with a combination of an electrode of nitrogen and phosphorus doping porous graphene and an ionic liquid electrolyte, and the supercapacitor exhibits high volumetric energy density and high volumetric power density.

2. Description of the Prior Art

Since the industrial revolution, the demand for petroleum and other petrochemical energies has been increased. The pollution caused by these fuels has been increased after years of exploitation and use. Accordingly, more and more attention has been paid to the development of renewable energy with zero carbon emission and sustainability in recent years. However, these renewable energies are not available all the time, and the main reason is that the use of these renewable energies depends on the weather. For example, solar energy is required to be set up in sunny places, and wind energy is not stable due to the intermittent wind and unstable wind speed. These reasons make the renewable energies unsuitable to supply electricity according to the varying demand for electricity. Therefore, it is urgent to develop energy storage devices to solve the current problems. The common energy storage devices include pumped-storage hydroelectricity storage, flywheel, superconducting magnetic energy storage, hydrogen energy storage, compressed air energy storage, battery, and supercapacitor.

Among all of the energy storage devices, batteries are the most common energy storage device. The principle of the batteries is converting chemical energy into electric energy. Although the battery has good storage capacity, the conversion rate between electric energy and chemical energy is limited by the kinetic properties of the oxidation-reduction (redox) reaction of the material of electrode, so it cannot meet the requirements of high-power charging and discharging. However, the electrical storage properties of the conventional capacitors are opposite to batteries. In the conventional capacitors, although the electric charges stored between the electrode plate and the dielectric material can be released instantly and provide extremely high power, the amount of electric charges stored in the dielectric capacitor is quite low, which is in the level about microfarad (p). However, the electricity stored in the conventional capacitor is less than that of the supercapacitor with the level about farad, thus the conventional capacitor cannot satisfy the demand for high energy. Therefore, the development and application of supercapacitors between batteries and traditional capacitors have been paid more and more attention due to the demands for high power and high energy. The supercapacitors have higher energy density than the conventional capacitors and higher power density than the batteries. Comparing to the batteries, the supercapacitors also have the advantages of: (1) good cycle life, (2) high efficiency of charging and discharging, (3) self-discharge effect of the battery, (4) wider operating temperature range, (5) environmental friendliness, and (6) safety.

Nowadays, active carbon is used as an electrode and the organic solution is used as an electrolyte in most of the commercial supercapacitors. Although organic solvents can provide wider potential windows, they are volatile, toxic and flammable, and therefore they are extremely harmful to human body and the environment. Aqueous solutions generally used as the electrolyte of supercapacitors also have been well researched. Electrolytes mainly including ACL, $A_2SO_4$, or $ANO_3$ (A=Li, Na, K) can facilitate high-power operation due to high ionic conductivity and high ionic concentration. However, the potential windows of these electrolytes are relatively small (about 1 V) because they are limited by the decomposition potential of water. According to the specific energy equation: $E=½ CV^2$, the specific energy is greater when the potential window is greater. Therefore, the potential windows of general aqueous solutions are only about 1 V, and the specific energy is smaller. However, the potential windows of the organic solvents can reach 2.5-2.7 V, but the organic solvents are not ideal electrolytes due to environmental considerations. Until the development of ionic liquids in recent years, the potential windows of ionic liquids can reach 4-5 V or more with appropriate combination of cations and anions, and the specific energy of the supercapacitor has been greatly improved.

However, the pore size of the commercial active carbon electrode is not suitable for the ionic liquid with high viscosity, thereby resulting in the decrease of capacitance. Accordingly, graphene having quasi-2D structure is used as the material of the electrode. The special structure of graphene can assist the ionic liquid to be adsorbed and desorbed on the surface of the carbon material. In addition, graphene also has many attractive properties, such as high carrier mobility (200000 $cm^2/Vs$), excellent thermal conductivity (about 5000 W/mK), high optical transmittance (about 97.7%), high theoretical specific surface area (2630 $m^2/g$), good mechanical strength, etc.

Different from seeking high gravimetric energy density and high gravimetric power density in the past, more and more efforts have been made to generate more energy in smaller volume in recent years. Therefore, the indexes of volumetric energy density and volumetric power density have also received more attentions. However, although the supercapacitor formed by combining the graphene electrode with the ionic liquid electrolyte has good gravimetric energy and power density, its volumetric energy and power performances still have room for improvement.

Therefore, the above-mentioned conventional technology still has many deficiencies, which is not a good design and requires to be improved urgently. In view of this, the present invention provides a supercapacitor with high volumetric energy density and high volumetric power density and its manufacturing method.

SUMMARY OF THE INVENTION

One aspect of the present invention is providing a supercapacitor. According to an embodiment of the present invention, the supercapacitor of the present invention includes a working electrode including an active material of nitrogen-phosphorus (N—P) doping porous graphene and an ionic liquid electrolyte.

Further, cations of the ionic liquid electrolyte include 1-Ethyl-3-methylimidazolium (EMI), N-methyl-N-propylpyrrolidinium (PMP), N-butyl-N-methylpyrrolidinium (BMP), or any combination thereof.

In another embodiment, anions of the ionic liquid electrolyte include Bis(fluorosulfonyl)imide (FSI), bis(trifluoromethylsulfony)imide (TFSI), tetrafluoroborate ($BF_4$), or any combination thereof.

In another embodiment, the working electrode further includes a conductive substrate, and the active material is deposited on the conductive substrate.

In another embodiment, the active material includes a porous graphene surface doped with more than 3 at % of nitrogen and more than 1 at % of phosphorus.

Another aspect of the present invention is providing a method for preparing the supercapacitor. According to an embodiment of the present invention, the method for preparing the supercapacitor of the present invention includes following steps: preparing an active material including nitrogen-phosphorus (N—P) doping porous graphene; depositing the active material on a conductive substrate to forma working electrode; and adsorbing an ionic liquid electrolyte on a surface of the working electrode having the active material.

Further, cations of the ionic liquid electrolyte include 1-Ethyl-3-methylimidazolium (EMI), N-methyl-N-propylpyrrolidinium (PMP), N-butyl-N-methylpyrrolidinium (BMP), or any combination thereof. Anions of the ionic liquid electrolyte include Bis(fluorosulfonyl)imide (FSI), bis(trifluoromethylsulfony)imide (TFSI), tetrafluoroborate ($BF_4$), or any combination thereof.

The active material is deposited on the conductive substrate by a blade coating method.

The method for preparing the supercapacitor further includes electrically activating the working electrode with the ionic liquid electrolyte adsorbed thereon.

In short, the N—P doping porous graphene is applied to the supercapacitor including the ionic liquid in the present invention, and the supercapacitor exhibits performances of good volumetric energy and power density. The operating potential window of the supercapacitor is improved through the selection of the ionic liquid, the active position of the electrode is increased and the tap density of graphene is enhanced by the working electrode of N—P doping porous graphene, and performances of volumetric energy density and volumetric power density of the supercapacitor can be improved. Especially in the aspect of the performance of power density, the volumetric power density of the supercapacitor prepared by the present invention can be 1.19 kW/L.

BRIEF DESCRIPTION OF THE DRAWINGS

FIG. 2 is a schematic diagram illustrating viscosities and conductivities of ionic liquids.

FIG. 3 is a schematic diagram illustrating diameters of different types of ions of the ionic liquid.

FIG. 9 is a schematic diagram illustrating an electrical performance of undoped porous graphene.

FIG. 10 is a schematic diagram illustrating an electrical performance of nitrogen-phosphorus (N—P) doping porous graphene.

DETAILED DESCRIPTION

In order to make the purpose, technical solution and advantage of the present invention more clearly understood, the present invention is detailed by reference to the following drawings and embodiments. It is noteworthy that these embodiments are only representative embodiments of the present invention, in which the specific methods, devices, conditions, materials, etc., are not intended to limit the present invention or the corresponding embodiments.

In the description of the present invention, the reference terms "one embodiment", "another embodiment", or "part of the embodiment" mean that the specific features, structures, materials, or characteristics described in conjunction in the embodiment are contained in at least one embodiment of the present invention. In this description, the indicative expression of the above terms does not necessarily refer to the same embodiment. Moreover, the specific features, structures, materials, or characteristics of the description can be combined in an appropriate way in any one or more embodiments.

In the description of the present invention, it should be understood that the terms "longitudinal", "transverse", "upper", "lower", "front", "rear", "left", "right", "top", "bottom", "inside", "outside", and other instructions of directions or positional relationships are based on the directions or positional relationships shown in the diagrams, they are only used for the convenience of describing the present invention and simplifying the description, and they are not intended to limit or imply that the device or assembly must have a specific orientation or be constructed and operated in a particular direction, thus it should not be understood as a limitation to the present invention.

Figure 1:
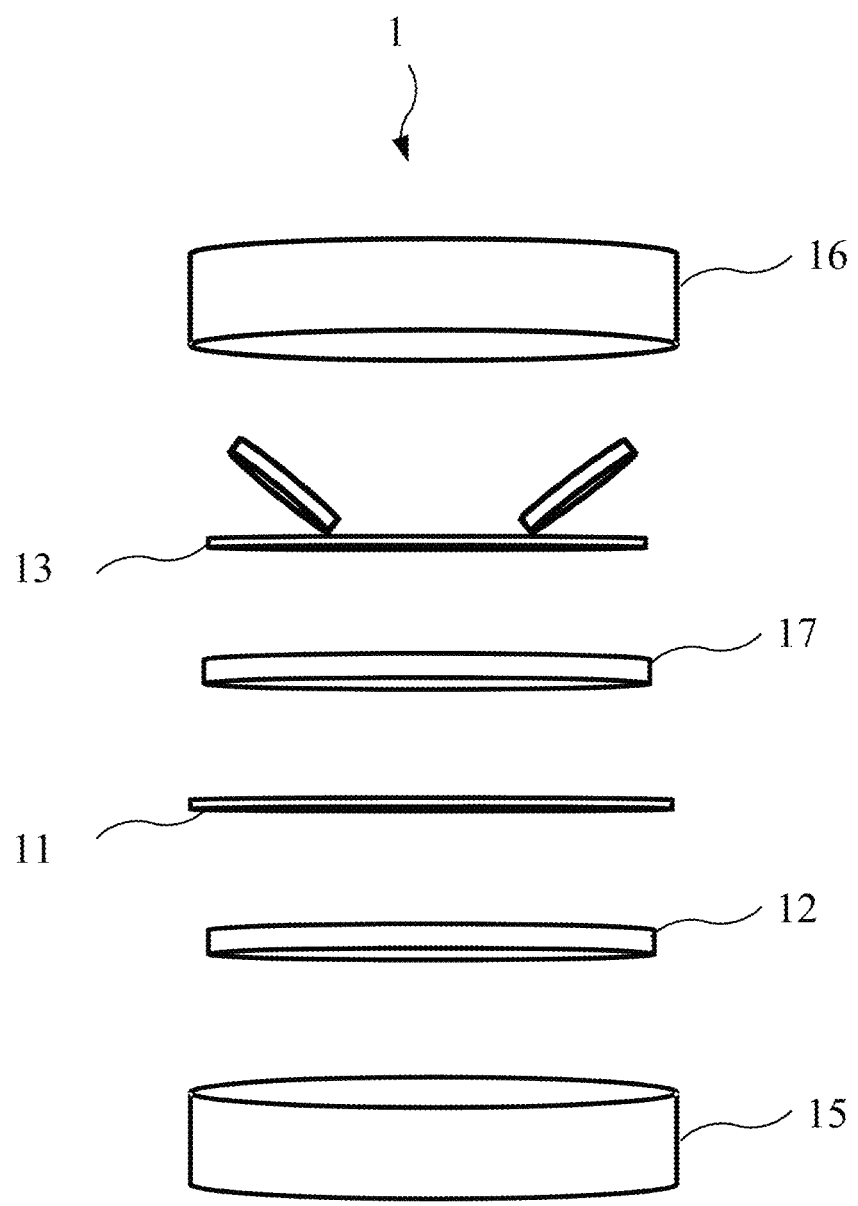
FIG. 1 is an exploded schematic diagram illustrating a supercapacitor according to an embodiment of the present invention.

Referring to FIG. 1, FIG. 1 is an exploded schematic diagram of a supercapacitor 1 according to an embodiment of the present invention. According to an embodiment of the present invention, the supercapacitor 1 of the present invention can be the bi-electrode supercapacitor, and the supercapacitor 1 includes an upper cover 16, a spring lamination 13, a counter electrode 17, a separator 11, a working electrode 12, a lower cover 15, and the ionic liquid electrolyte (not shown) disposed between the upper cover 16 and the lower cover 15.

The type of the above-mentioned coin cell battery is CR2032. Both of the working electrode 12 and the counter electrode 17 are aluminum substrates coated with nitrogen-phosphorus (N—P) doping porous graphene, and therefore the working electrode 12 and the counter electrode 17 may be the same, but not limited thereto. In another embodiment, the counter electrode 17 may be a conductive substrate, such as the aluminum substrate or stainless steel substrate. In still another embodiment, an active material disposed on the conductive substrate may be porous graphene that is not doped with nitrogen and phosphorus, such as nitrogen doping porous graphene, phosphorus doping porous graphene, porous graphene, graphene, carbon nanotube, active carbon, or other carbon materials. A cellulose membrane produced by Nippon Kodoshi Corporation is used as the separator. 1-Ethyl-3-methylimidazolium Bis(fluorosulfonyl)imide (EMI-FSI) is used as the ionic liquid electrolyte.

In this embodiment, the supercapacitor 1 can be processed separately before assembling. The upper cover 16, the lower cover 15, and the spring lamination 13 are soaked in 95% alcohol for ultrasonic vibration cleaning for one hour before assembly, and baked overnight in an oven at 80° C. under the normal atmosphere later. The aluminum substrate will be wiped clean with alcohol. Some molecular sieves are added into the ionic liquid electrolyte (EMI-FSI) to remove water, and the water content of the ionic liquid electrolyte can be less than 100 ppm.

Referring to FIG. 2 and FIG. 3, FIG. 2 is a diagram illustrating viscosities and conductivities of ionic liquids, and FIG. 3 is a diagram illustrating diameters of different types of ions of the ionic liquid. The ionic liquid electrolyte with an ionic liquid viscosity less than 60 mPa·s, a conductivity greater than 0.5 S/m, and diameters of anions and cations less than 0.7 nanometers (nm) can be used in the present invention. In a preferred embodiment, EMI-FSI is used as the ionic liquid electrolyte in the present invention, and the main reasons can be divided into two aspects of "viscosity, conductivity" and "ion size". Firstly, it can be selected according to the aspect of viscosity and conductivity. The viscosities and conductivities of ionic liquids currently available in the market, such as 1-ethyl-3-methylimidazolium tetrafluoroborate (EMI-BF$_4$), 1-ethyl-3-methylimidazolium bis(trifluoromethylsulfony)imide (EMI-TFSI), 1-Ethyl-3-methylimidazolium Bis(fluorosulfonyl)imide (EMI-FSI), N-methyl-N-propylpyrrolidiniumbis(fluorosulfonyl)imide (PMP-FSI), and N-butyl-N-methylpyrrolidinium bis(fluorosulfonyl)imide (BMP-FSI), are measured and shown in FIG. 2. Since the viscosity and conductivity of the electrolyte will affect the migration rate of charged ions from the working electrode to the counter electrode (or from the counter electrode to the working electrode), the ionic liquid with lower viscosity and higher conductivity will be more suitable to be used as the electrolyte. As shown in FIG. 2, EMI-FSI has the lowest viscosity and the highest conductivity among five common ionic liquids. Therefore, a higher capacitance value of the supercapacitor can be obtained in the process of rapid charging and discharging if EMI-FSI with lower viscosity and higher conductivity is used as the ionic liquid electrolyte of the supercapacitor, and the supercapacitor can exhibit excellent high-power electrical performance.

Further, it can also be selected according to the aspect of ion size. Since it is easier for ions to be adsorbed to or desorbed from the surface of the electrode (e.g. the surface of graphene) when the sizes of ions of the electrolyte are smaller, the charge exchanging ability between the electrolyte and the electrode can be improved and the capacitance value can be further enhanced. As shown in FIG. 3, EMI$^+$ has the smallest cation size among three common cations, which means that using EMI$^+$ should improve the capacitance of supercapacitor. As for anions, although the ion size of BF$^{4-}$ is smaller than that of FSI$^-$, EMI-FSI has lower viscosity and higher conductivity than EMI-BF$_4$ according to the viscosities and conductivities shown in FIG. 2. Taking the application of fast charging and discharging of the supercapacitor into consideration, the preferred embodiment of the present invention will select EMI-FSI as the ionic liquid electrolyte, but not limited thereto.

Figure 14:
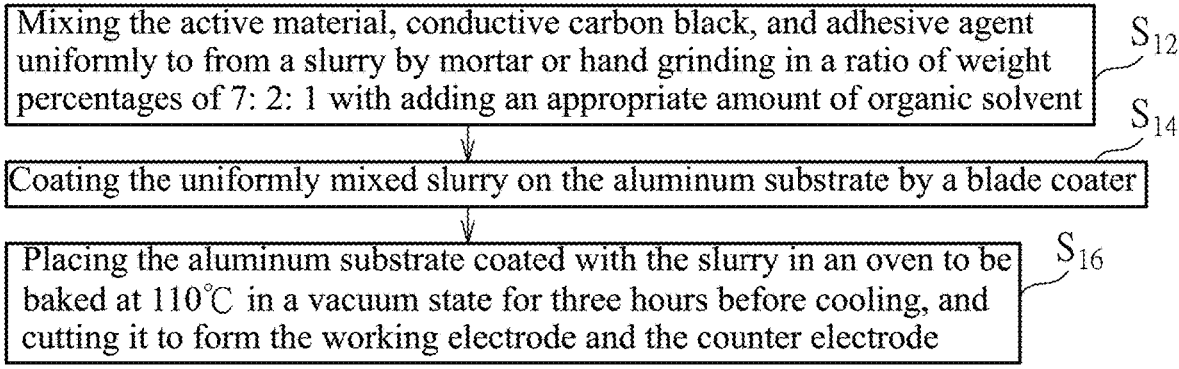
FIG. 14 is a schematic diagram illustrating a process flow of a preparation method of a working electrode and a counter electrode.

In one embodiment, referring to FIG. 14, a preparation method of the working electrode 12 and the counter electrode 17 can include following steps. Step S12: mixing the active material, conductive carbon black, and adhesive agent uniformly to form a slurry by mortar or hand grinding in a ratio of weight percentages of 7:2:1 with adding an appropriate amount of organic solvent. The actual weights of the active material, conductive carbon black, and adhesive agent can be 0.105 g, 0.03 g, and 0.015 g respectively. Step S14: coating the uniformly mixed slurry on the aluminum substrate by a blade coater. The thickness of the blade can be 200 micrometers (μm), and the coating speed of the blade coater can be 300 rpm. Step S16: placing the aluminum substrate coated with the slurry in an oven to be baked at 110° C. in a vacuum state for three hours before cooling, and cutting it to form the working electrode 12 and the counter electrode 17. The ideal size of the working electrode 12 and the counter electrode 17 after cutting is 1.33 cm$^2$. The above-mentioned active material is N—P doping porous graphene, the conductive carbon black can be Super P, the adhesive agent is polyvinylidene difluoride (PVDF), and the organic solvent is N-methyl-2-pyrrolidone (NMP).

Next, the above-mentioned components are placed inside the glove box (in a protective atmosphere) to be assembled to form the bi-electrode supercapacitor. Before the working electrode 12 and the counter electrode 17 are placed in the glove box, the working electrode 12 and the counter electrode 17 are placed in the oven and baked in a vacuum state of 100° C. for 3 hours first, and the working electrode 12 and the counter electrode 17 are cooled down to remove moisture. The working electrode 12 and the counter electrode 17 are immediately placed into the glove box after they are cooled down. Next, the supercapacitor 1 is assembled in the order of the lower cover 15, the working electrode 12, the separator 11 (simultaneously dripping the electrolyte), the counter electrode 17, the spring lamination 13, and the upper cover 16 inside the glove box, as shown in FIG. 1.

Further, the assembled supercapacitor can be electrically activated first, that is, the working electrode 12 to which the ionic liquid electrolyte is adsorbed is electrically activated. The activation condition is charging and discharging at a constant current for three cycles under the condition of a current density of 1 A/g and a potential window of 3.5 V from an open circuit potential.

Figure 15:
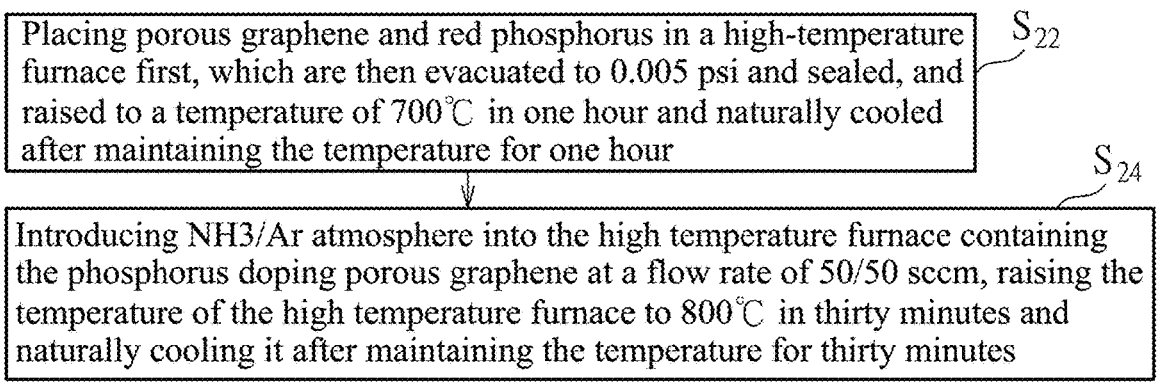
FIG. 15 is a schematic diagram illustrating a process flow of a preparation method of an active material.

In addition, referring to FIG. 15, a preparation method of the active material can include following steps. Step S22:

placing porous graphene and red phosphorus in a high-temperature furnace first, which are then evacuated to 0.005 psi and sealed, and raised to a temperature of 700° C. in one hour and naturally cooled after maintaining the temperature for one hour to obtain phosphorus doping porous graphene. The natural cooling may be furnace cooling or air cooling. Step S24: introducing ammonia (NH3) or argon (Ar) atmosphere into the high temperature furnace containing the phosphorus doping porous graphene at a flow rate of 50/50 sccm, raising the temperature of the high temperature furnace to 800° C. in thirty minutes and naturally cooling it after maintaining the temperature for thirty minutes, and the active substance including N—P doping porous graphene can be prepared. The active material can include a porous graphene surface doped with more than 3 at % of nitrogen and more than 1 at % of phosphorus.

In order to prove the nitrogen and phosphorus doping effects of porous graphene, an active material of undoped porous graphene is further prepared as a control group in the present invention. The preparation process of the active material of undoped porous graphene includes placing the porous graphene in the nitrogen environment (50 sccm) and preforming a heat treatment. The temperature raising rate and the temperature holding time are the same as those of the above-mentioned preparation process of N—P doping porous graphene. Additionally, the mixing ratio of the slurry and the preparation of the working electrode are also the same as those of the active material of N—P doping porous graphene of the present invention. A tap density of N—P doping porous graphene prepared by the above-mentioned preparation methods of the present invention is 17.5 mg/cm$^3$, and a tap density of undoped porous graphene is 4.3 mg/cm$^3$.

Figure 16:
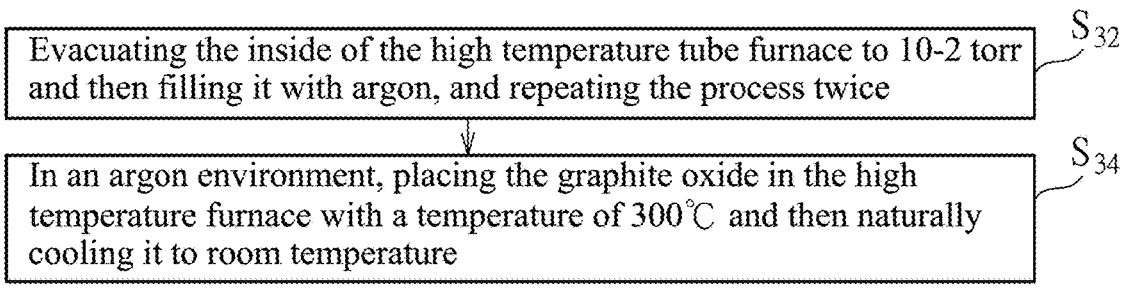
FIG. 16 is a schematic diagram illustrating a process flow of a preparation method of the porous graphene.

Further, referring to FIG. 16, a preparation method of porous graphene includes following two steps. Step S32: evacuating the inside of the high temperature tube furnace to 10$^{-2}$ torr and then filling it with argon, and repeating the process twice. Step S34: in an argon environment, placing the graphite oxide in the high temperature furnace with a temperature of 300° C. and then naturally cooling it to room temperature, and porous graphene can be obtained.

Figure 17:
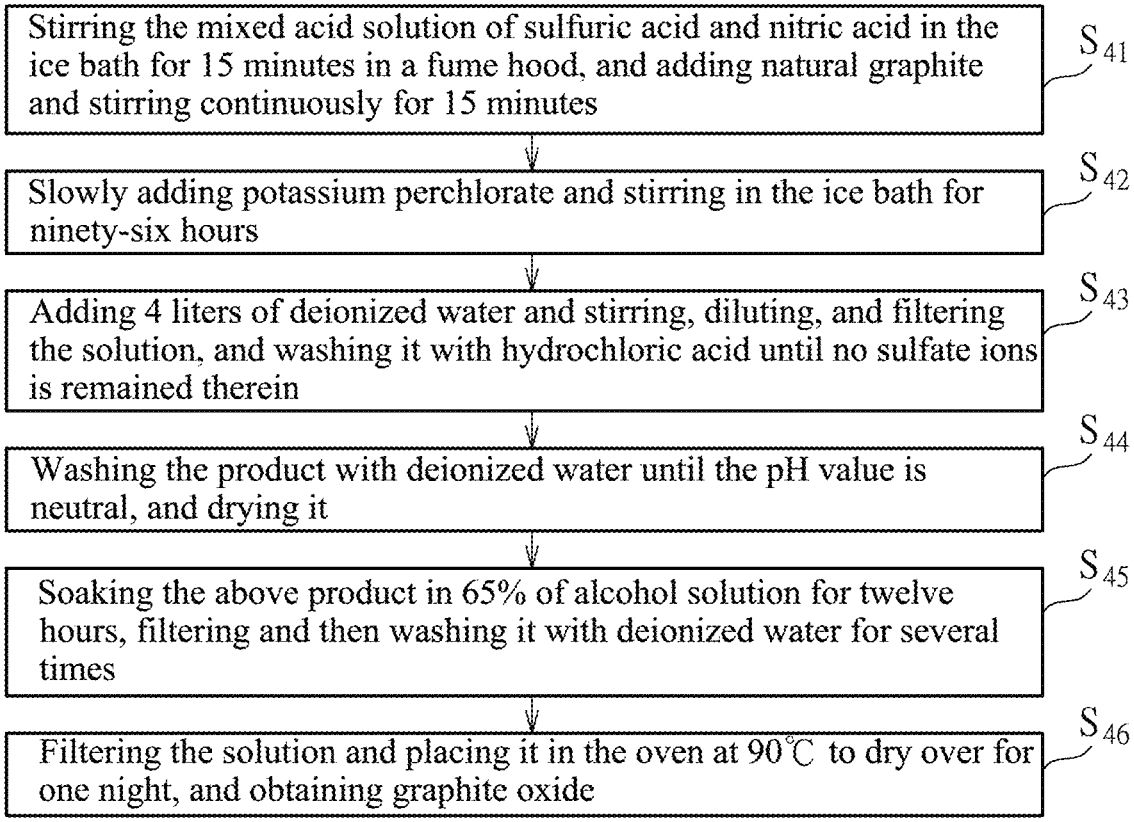
FIG. 17 is a schematic diagram illustrating a process flow of a preparation process of a graphite oxide.

Referring to FIG. 17, a preparation process of the above-mentioned graphite oxide can include following steps. Step S41: stirring the mixed acid solution of sulfuric acid and nitric acid in the ice bath for 15 minutes in a fume hood, and adding the commercial natural graphite (99.999% of purity, 150 mesh or more) and stirring continuously for 15 minutes; Step S42: slowly adding potassium perchlorate with the purpose of avoiding excessive heating rate or splashing of solution caused by intense oxidation reaction, and stirring in the ice bath for ninety-six hours. Step S43: adding 4 liters of deionized water and stirring, diluting, and filtering the solution, and washing it with hydrochloric acid until no sulfate ions (SO$_4^{2-}$) is remained therein; Step S44: washing the product with deionized water until the pH value is neutral, and drying it; Step S45: soaking the above product in 65% of alcohol solution for twelve hours, filtering and then washing it with deionized water for several times; Step S46: filtering the solution and placing it in the oven at 90° C. to dry over for one night, and obtaining graphite oxide.

Figure 4:
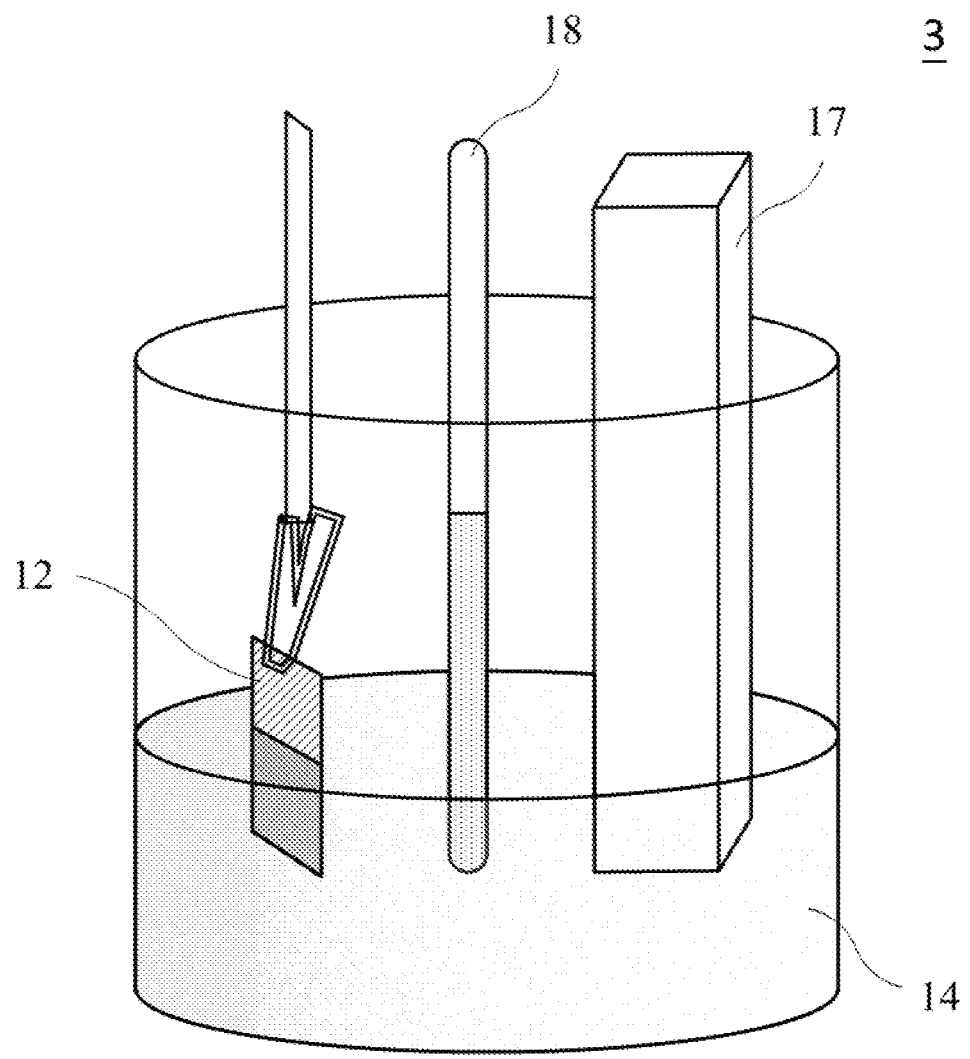
FIG. 4 is a schematic diagram of a structure of an electrical evaluation device according to the present invention.

Referring to FIG. 4, FIG. 4 is a schematic diagram of a structure of an electrical evaluation device 3 according to another embodiment of the present invention. In order to compare the capacitance properties of single electrodes, the present invention further provides a structure of the electrical evaluation device. According to another embodiment of the present invention, the electrical evaluation device 3 of the present invention includes the working electrode 12, the counter electrode 17, a reference electrode 18, the ionic liquid electrolyte 14, and a container capable of containing the ionic liquid.

The working electrode 12 includes the active material of N—P doping porous graphene, and the active material is adsorbed to a nickel mesh. A graphite rod is used as the counter electrode 17. The reference electrode 18 can be a platinum wire. The ionic liquid can be 1-Ethyl-3-methyl-imidazolium Bis(fluorosulfonyl)imide (EMI-FSI).

Figure 5:
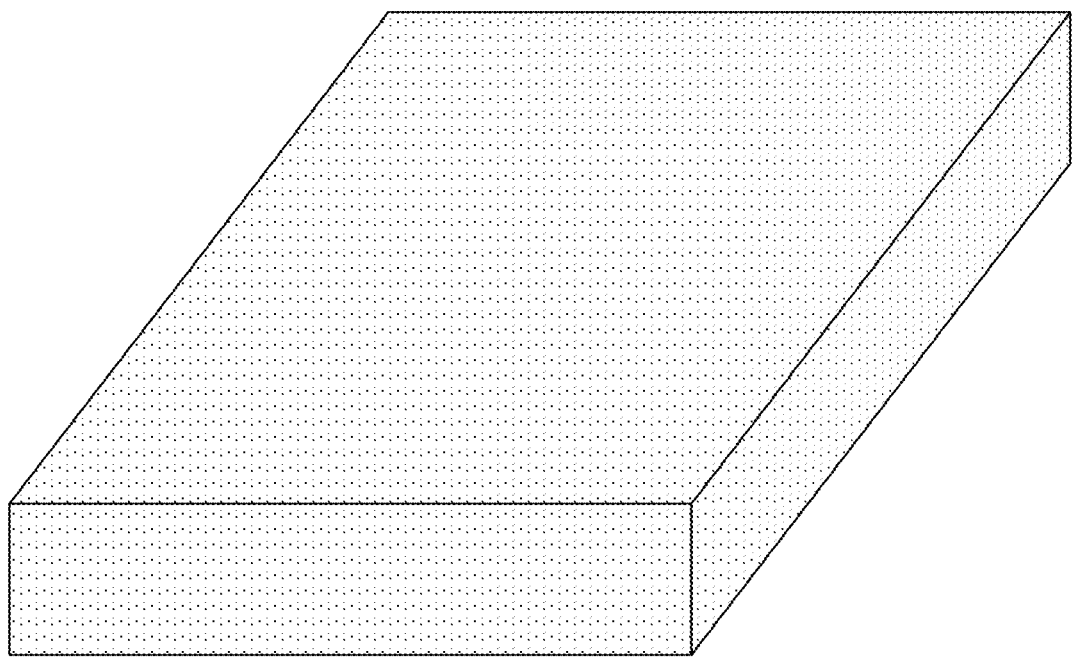
FIG. 5 to FIG. 7 are schematic diagrams illustrating a preparation of a working electrode according to an embodiment of the present invention.
Figure 6:
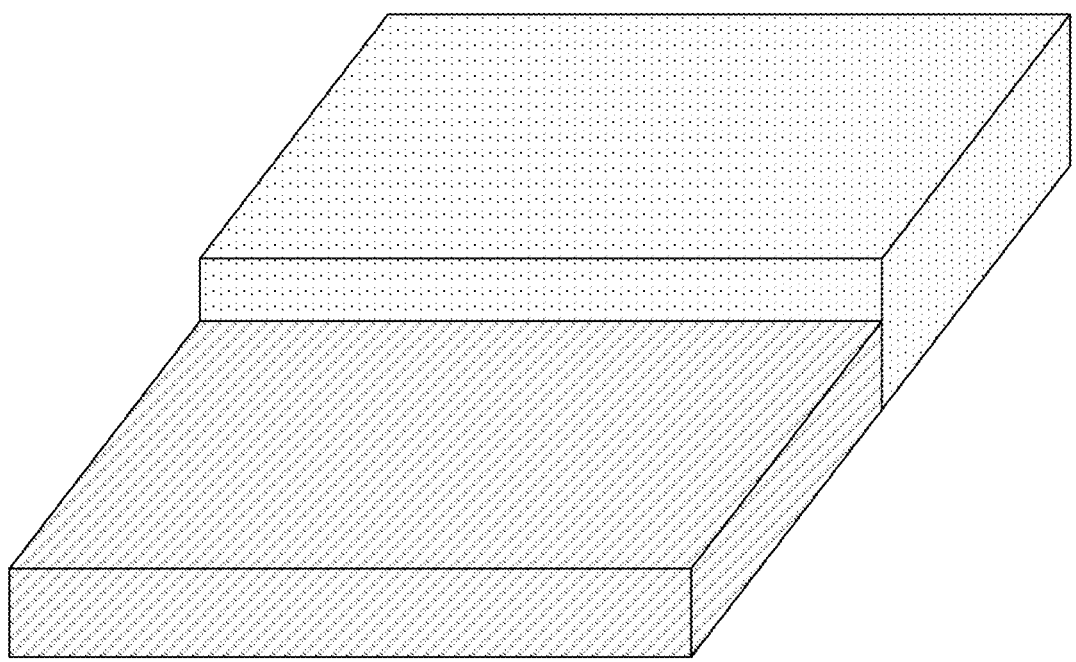
Figure 7:
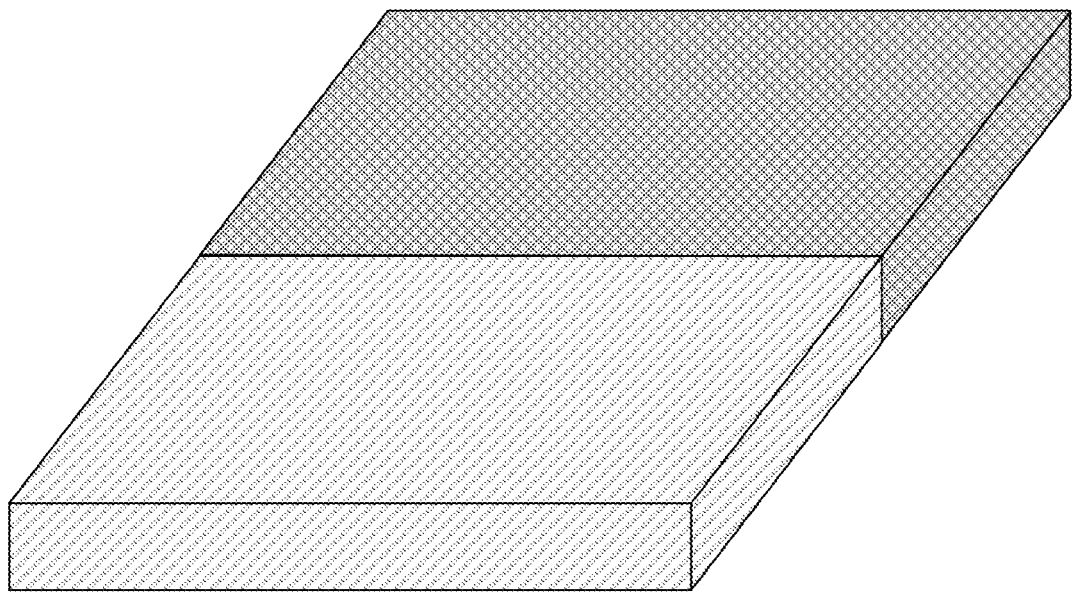

Referring to FIG. 5 to FIG. 7, FIG. 5 to FIG. 7 are schematic diagrams illustrating a preparation of the working electrode 12 according to an embodiment of the present invention. The above-mentioned graphite rod and platinum wire are soaked in alcohol (95%) for ultrasonic vibration cleaning for an hour and dried before assembling. Some molecular sieves are added into the ionic liquid (EMI-FSI) to remove water, and the water content of the ionic liquid can be less than 100 ppm. The ideal size of the nickel mesh is 1 cm*1 cm in the present invention, and it is shown in FIG. 5.

Figure 18:
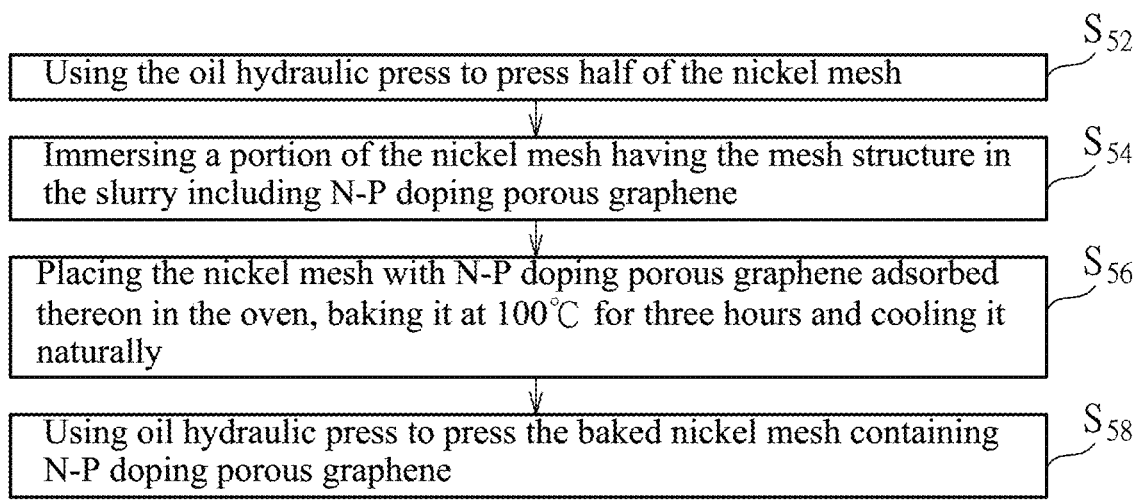
FIG. 18 is a schematic diagram illustrating a process flow of a preparation method of a nickel mesh with N—P doping porous graphene adsorbed thereon.

Referring to FIG. 18, a preparation method of the nickel mesh with N—P doping porous graphene adsorbed thereon can include following steps. Step S52: using the oil hydraulic press to press half of the nickel mesh to transfer the mesh structure into the dense structure (as shown in FIG. 6). The purpose of this step is preventing the slurry from being adsorbed onto the nickel mesh (the dense structure) when the nickel mesh is immersed in the N—P doping porous graphene slurry later. A portion where the slurry is not adsorbed thereon can be the location of the crocodile clip used for connecting wires during subsequent electrochemical measurements, and therefore it is necessary to avoid the slurry adsorption in this portion to prevent unnecessary reactions. Step S54: immersing a portion of the nickel mesh having the mesh structure in the slurry including N—P doping porous graphene (for about one second), and the N—P doping porous graphene can be adsorbed to the portion of the nickel mesh having the mesh structure (another portion of the nickel mesh having the dense structure is not immersed in the slurry). Step S56: placing the nickel mesh with N—P doping porous graphene adsorbed thereon in the oven, baking it at 100° C. for three hours and cooling it naturally. Step S58: using oil hydraulic press to press the baked nickel mesh containing N—P doping porous graphene (pressing the entire nickel mesh, i.e., both of the portions of the mesh structure and the dense structure are pressed), such that the nickel mesh with N—P doping porous graphene adsorbed thereon (i.e. working electrode 12) can be prepared, as shown in FIG. 7. The ideal weight of the adsorbed active material is 0.15 mg, and the ratio of the atomic percentages of carbon, oxygen, nitrogen, and phosphorus of the active material is 87:9:3:1, but not limited thereto. The active material may have a porous graphene surface doped with more than 3 at % of nitrogen and more than 1 at % of phosphorus.

The above-mentioned nickel mesh is immersed in deionized water for ultrasonic vibration for one hour and immersed in alcohol for ultrasonic vibration cleaning for one hour before it is immersed in the slurry, and finally it is placed in the oven for baking at 80° C. under the normal atmosphere overnight to ensure it is dried.

The above-mentioned N—P doping porous graphene contained slurry is formed by dissolving the active material (0.035 g), conductive carbon black (0.01 g), adhesive agent (0.005 g) in a ratio of the weight percentages of 7:2:1 in 10 ml of the organic solvent. Next, the ultrasonic vibration is performed to the slurry for three hours to make the slurry disperse uniformly. The active material is N—P doping porous graphene. The conductive carbon black is Super P. The adhesive agent is polyvinylidene difluoride (PVDF). The organic solution is N-methyl-2-pyrrolidone (NMP). In addition, the preparation and assembly methods of the working electrode of the undoped porous graphene prepared by the present invention can refer to the above description.

Figure 8:
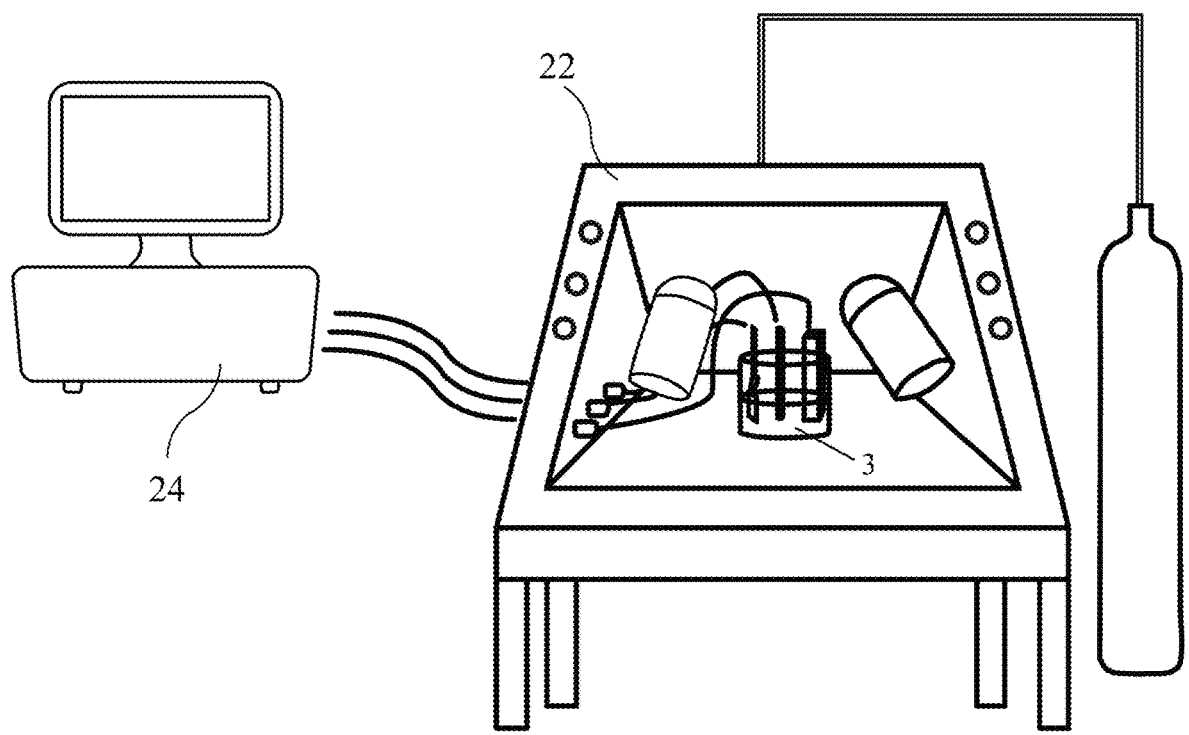
FIG. 8 is a schematic diagram illustrating an electrical measurement of the electrical evaluation device according to FIG. 4.

Referring to FIG. 8 and FIG. 4, FIG. 8 is a schematic diagram illustrating an electrical measurement of the electrical evaluation device 3 according to FIG. 4. In order to measure electrical properties of the single electrode of the active material of the present invention, the above-mentioned electrical evaluation device 3 is placed inside the glove box 22 (under the protective nitrogen atmosphere). One end of the reference electrode 18 (platinum wire), one end of the counter electrode 17 (graphite rod), and one end of the working electrode 12 (nickel mesh with or without N—P doping porous graphene) are respectively clamped by the crocodile clips of the wires (three wires). The other ends of the reference electrode 18, the counter electrode 17, and the working electrode 12 are immersed in the container containing the ionic liquid electrolyte 14 (EMI-FSI, the water content is less than 100 ppm), and the tri-electrode electrical evaluation device 3 of the present invention can be prepared according to the above method. In addition, the reference electrode 18, the counter electrode 17, and the working electrode 12 cannot be in contact with each other to prevent the occurrence of short circuit. Next, these three wires are connected from the inside of the glove box 22 to the electrochemical analyzer 24 (Autolab) at the outside of the glove box 22 to facilitate electrical measurement.

Referring to FIG. 9 and FIG. 10, FIG. 9 is a schematic diagram illustrating an electrical performance of undoped porous graphene, and FIG. 10 is a schematic diagram illustrating an electrical performance of N—P doping porous graphene. The tri-electrode electrical evaluation device 3 is electrically activated before performing the electrochemical measurement. The electrical activation is performed under the activation condition of charging and discharging for two cycles with cyclic voltammetry under the condition of the scanning rate of 50 mV/s and the potential window of −2.1-1.4V (vs. Pt) from the open circuit potential. The electrical measurement can be performed after the tri-electrode electrical evaluation device 3 is activated. The measurement condition can be performing the electrical measurement with cyclic voltammetry under the condition of scanning with different scanning rates (referring to FIG. 9 and FIG. 10 for detailed scanning rates) and the potential window of −2.1-1.4 V (vs. Pt) from the open circuit potential.

Comparing FIG. 9 and FIG. 10, N—P doping porous graphene exhibits better electrical performance in high-speed environment than undoped porous graphene. At the scanning rate of 3000 mV/s, the capacitance of undoped porous graphene is only 28 F/g, but the capacitance of N—P doping porous graphene can reach 38 F/g. The excellent high-speed electrochemical property can be attributed mainly to the doping of nitrogen and phosphorus. The doping elements of nitrogen and phosphorus can provide free electrons to graphene, thereby increasing the concentration of electrons, and improving the conductivity. Therefore, graphene can exhibit better performance in the environment of high-speed charging and discharging.

Figure 11:
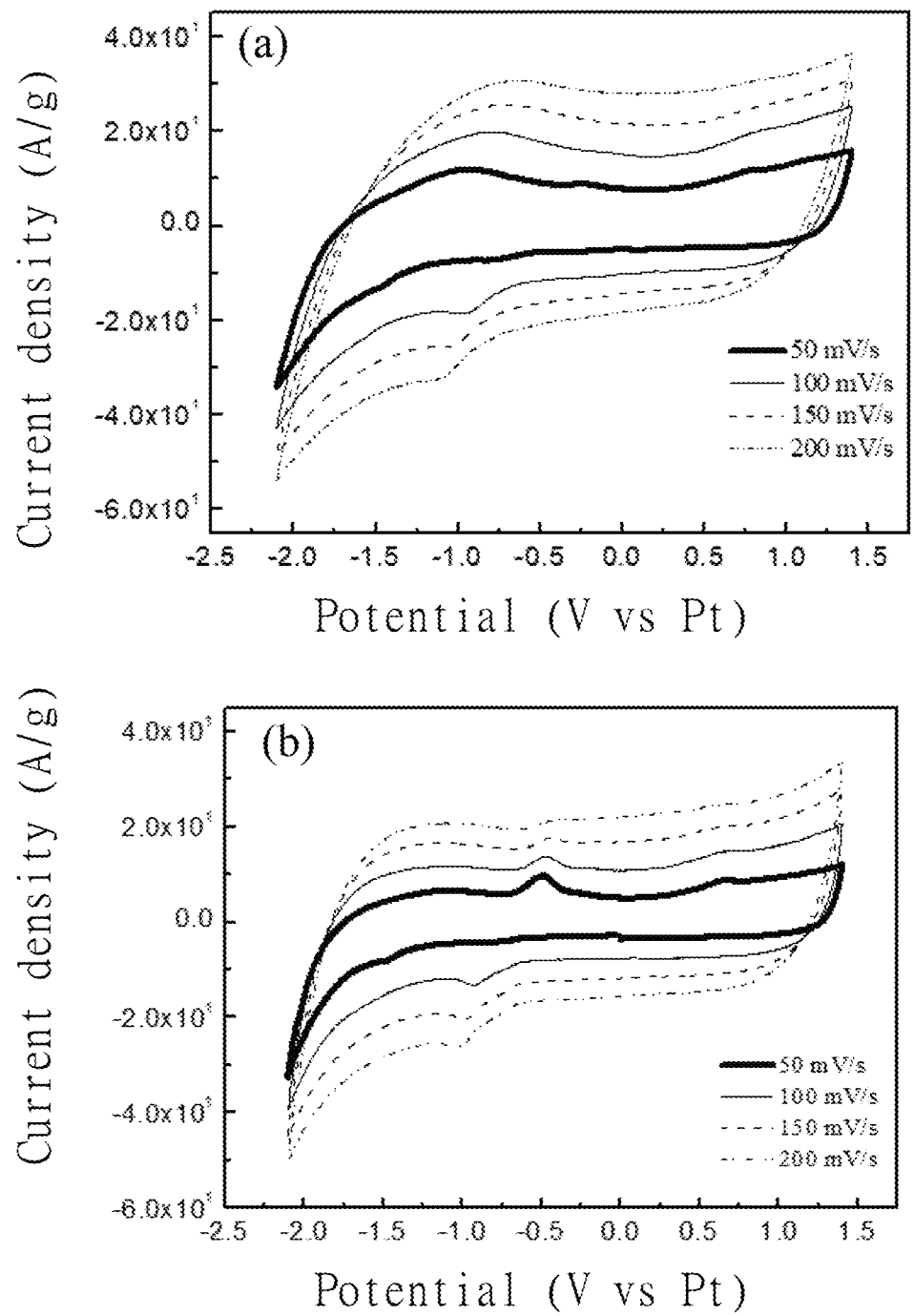
FIG. 11 are cyclic voltammograms at different scanning rates of (a) undoped porous graphene electrode and (b) N—P doping porous graphene electrode.

In addition, referring to FIG. 11, FIG. 11 are cyclic voltammograms at different scanning rates of (a) undoped porous graphene electrode and (b) N—P doping porous graphene electrode. As shown in FIG. 11, comparing to the undoped porous graphene electrode, an additional redox peak is generated during the process of charging and discharging of the N—P doping porous graphene electrode of the present invention, the energy storage mechanism can change from the original electric double-layer reaction to the pseudo-capacitive effect, and this additional redox reaction can also facilitate the improvement of electrical performance.

Figure 12:
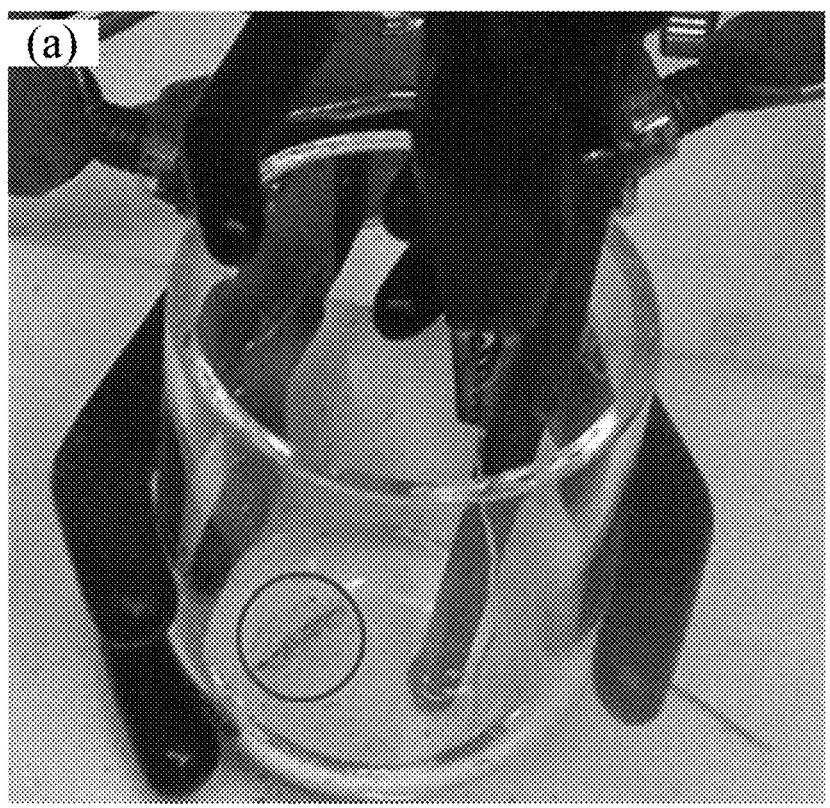
FIG. 12 are schematic diagrams illustrating the powder fell from (a) undoped porous graphene electrode and (b) N—P doping porous graphene electrode after charging and discharging for fifty cycles.
Figure 12:
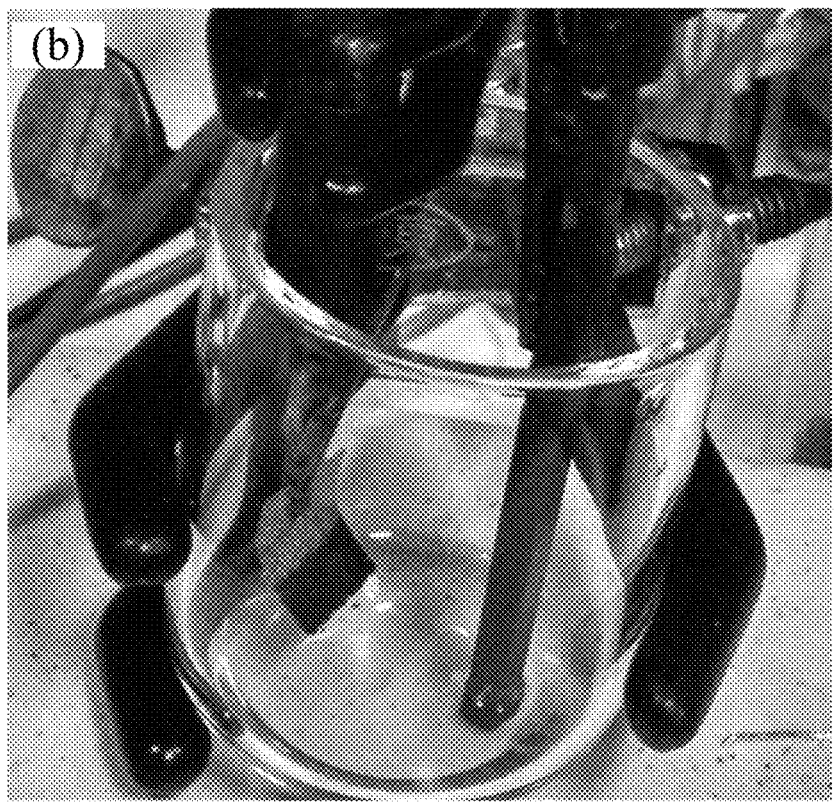

Referring to FIG. 12, FIG. 12 are schematic diagrams illustrating the powder fell from (a) undoped porous graphene electrode and (b) N—P doping porous graphene electrode after charging and discharging for fifty cycles. For an ideal material of electrode, the electrode is required to maintain its original structure after charging and discharging (no structure collapse/powder falling), and such material can be considered as the ideal material of electrode. As shown in FIG. 12, the electrode of undoped porous graphene has already disintegrated. Accordingly, the active material of N—P doping porous graphene of the present invention is the ideal material of electrode for EMI-FSI ionic liquid electrolyte.

Figure 13:
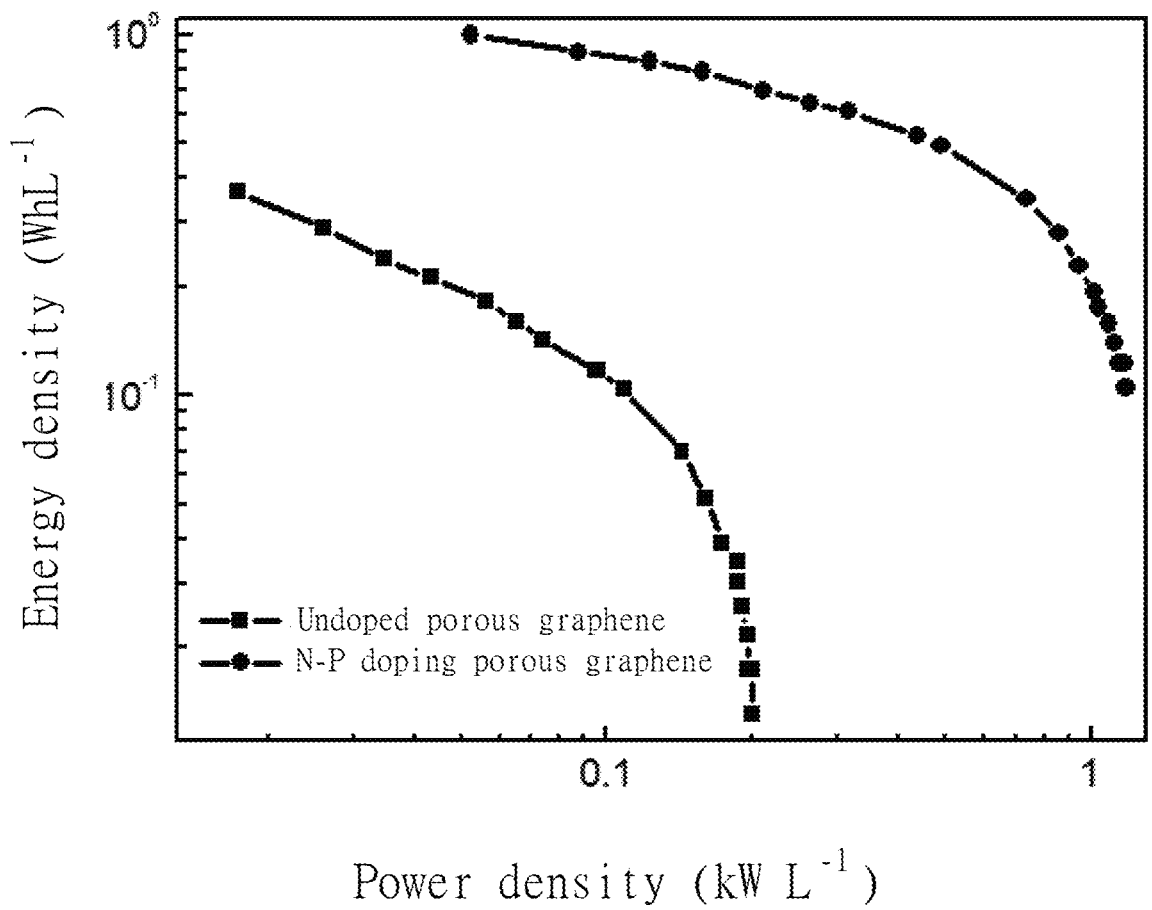
FIG. 13 is a schematic diagram illustrating volumetric energy density and volumetric power density of different working electrodes.

Further, referring to FIG. 13, FIG. 13 is a schematic diagram illustrating volumetric energy density and volumetric power density of the bi-electrode supercapacitor with different working electrodes. As shown in FIG. 13, the physical properties of graphene can be greatly improved with the nitrogen and phosphorus doping technology of the present invention, thereby improving performances of volumetric energy density and volumetric power density. Comparing to the original supercapacitor with undoped porous graphene (energy density: 0.36 Wh/L, power density: 0.2 kW/L), the volumetric energy density and volumetric power density of the supercapacitor with N—P doping porous graphene prepared by the present invention respectively can reach 1 Wh/L and 1.19 kW/L.

In summary, the N—P doping porous graphene is applied to the supercapacitor including the ionic liquid in the present invention, and the supercapacitor exhibits performances of good volumetric energy and power density. The operating potential window of the supercapacitor is improved through the selection of the ionic liquid, the active position of the electrode is increased and the tap density of graphene is enhanced by the working electrode of N—P doping porous graphene, and performances of volumetric energy density and volumetric power density of the supercapacitor can be improved. Especially in the aspect of the performance of power density, the volumetric power density of the supercapacitor prepared by the present invention can be 1.19 kW/L.

The features and spirit of the present invention can be described more clearly in view of the above detailed description of preferred embodiments, but the scope of the present invention is not limited by the above disclosed preferred embodiments. On the contrary, it is intended to cover various adjustments and arrangements of equality within the scope of the claims of the present invention. Therefore, the scope of the claims of the present invention should be interpreted in the broadest way according to the above description, so that it can cover all possible adjustments and arrangements with equality.

What is claimed is:

1. A supercapacitor, comprising:
   a working electrode, comprising an active material of nitrogen-phosphorus (N—P) doping porous graphene; and
   an ionic liquid electrolyte, wherein a viscosity of the ionic liquid electrolyte is less than 60 mPa·s, a conductivity of the ionic liquid electrolyte is greater than 0.5 S/m, a diameter of anions of the ionic liquid electrolyte is less than 0.7 nm, and a diameter of cations of the ionic liquid electrolyte is less than 0.7 nm.

2. The supercapacitor of claim 1, wherein the cations of the ionic liquid electrolyte comprise 1-Ethyl-3-methylimidazolium (EMI), N-methyl-N-propylpyrrolidinium (PMP), N-butyl-N-methylpyrrolidinium (BMP), or any combination thereof.

3. The supercapacitor of claim 1, wherein the anions of the ionic liquid electrolyte comprise one selected from a group consisting of Bis(fluorosulfonyl) imide (FSI), bis(trifluoromethylsulfony)imide (TFSI), tetrafluoroborate ($BF_4$), and any combination thereof.

4. The supercapacitor of claim 1, wherein the working electrode comprises a conductive substrate, and the active material is deposited on the conductive substrate.

5. The supercapacitor of claim 1, wherein the active material comprises a porous graphene surface doped with more than 3 at % of nitrogen and more than 1 at % of phosphorus.

6. A method for preparing a supercapacitor, comprising:
preparing an active material comprising nitrogen-phosphorus (N—P) doping porous graphene;
depositing the active material on a conductive substrate to form a working electrode; and
adsorbing an ionic liquid electrolyte on a surface of the working electrode having the active material,
wherein a viscosity of the ionic liquid electrolyte is less than 60 mPa·s, a conductivity of the ionic liquid electrolyte is greater than 0.5 S/m, a diameter of anions of the ionic liquid electrolyte is less than 0.7 nm, and a diameter of cations of the ionic liquid electrolyte is less than 0.7 nm.

7. The method for preparing the supercapacitor of claim 6, wherein the cations of the ionic liquid electrolyte comprise 1-Ethyl-3-methylimidazolium (EMI), N-methyl-N-propylpyrrolidinium (PMP), N-butyl-N-methylpyrrolidinium (BMP), or any combination thereof.

8. The method for preparing the supercapacitor of claim 6, wherein the anions of the ionic liquid electrolyte comprise Bis(fluorosulfonyl) imide (FSI), bis(trifluoromethylsulfony) imide (TFSI), tetrafluoroborate ($BF_4$), or any combination thereof.

9. The method for preparing the supercapacitor of claim 6, wherein the active material is deposited on the conductive substrate by a blade coating method.

10. The method for preparing the supercapacitor of claim 6, wherein preparing the active material comprising the N—P doping porous graphene further comprises following sub-steps:
placing porous graphene and red phosphorus in a vacuum environment, and raising a temperature to 700° C. in one hour to form a phosphorus doping porous graphene; and
placing the phosphorus doping porous graphene in an ammonia environment or an argon environment, and raising a temperature to 800° C. in thirty minutes to form the active material.

11. The method for preparing the supercapacitor of claim 6, further comprising electrically activating the working electrode with the ionic liquid electrolyte adsorbed thereon.

* * * * *